United States Patent Office 3,709,766
Patented Jan. 9, 1973

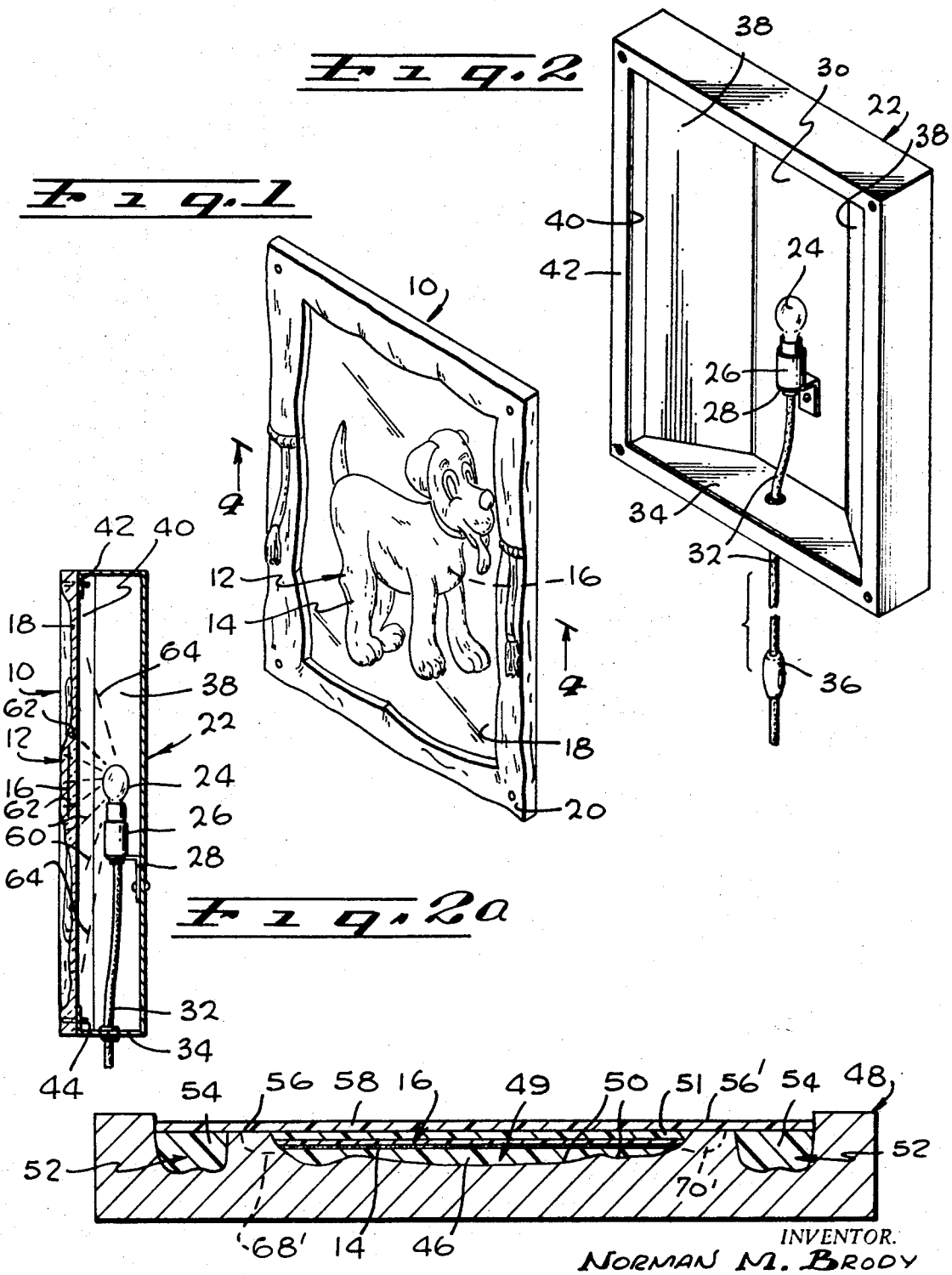

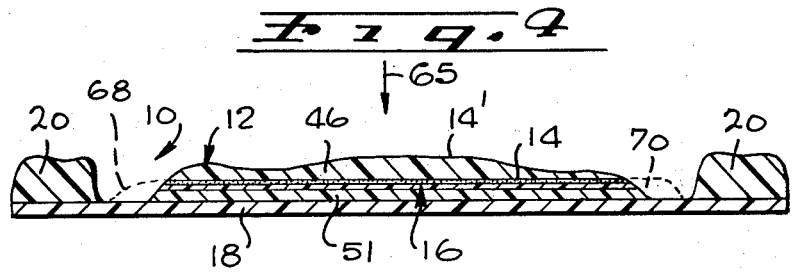
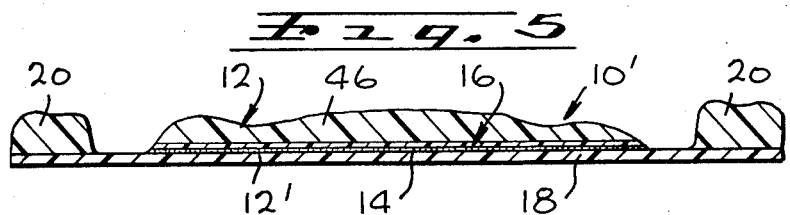
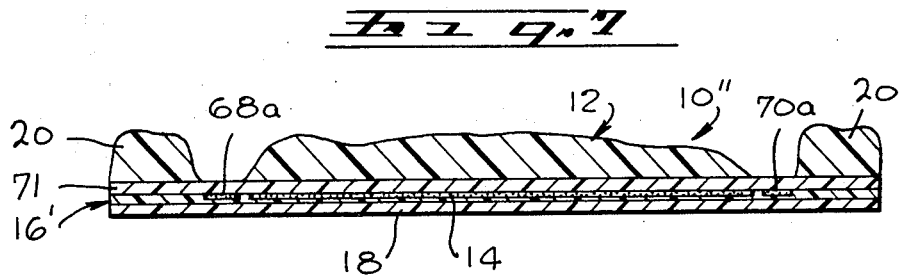
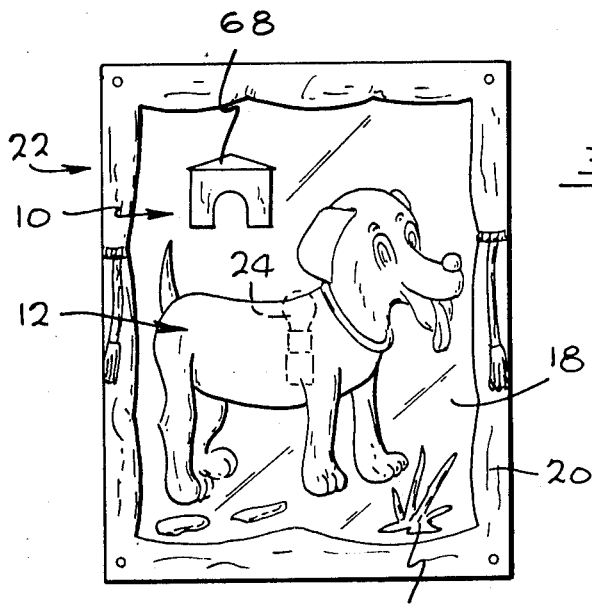

3,709,766
DECORATIVE LIGHT DIFFUSING ELEMENT
Norman M. Brody, Los Angeles, Calif., assignor to
Norman Industries, Inc., Santa Fe Springs, Calif.
Filed Aug. 17, 1970, Ser. No. 64,533
Int. Cl. B44f 1/00, 7/00
U.S. Cl. 161—3.5
13 Claims

ABSTRACT OF THE DISCLOSURE

Lamp element comprising three dimensional plastic colored article, e.g. reproduction of a cartoon character and the like, in the form of a clear transparent polyester cast resin body having a colored fiber glass paper inlay embedded in the resin, such inlay preferably being a silk screened multicolored configuration, the cast resin body having an external shape corresponding to the external shape of the colored inlay, forming a three dimensional plastic duplicate of the colored inlay having the corresponding coloration and outlines of the colored fiber glass paper inlay, and creating a three dimensional effect to the eye of an observer; and a light translucent polyester resin sheet attached to the rear surface of the colored cast resin body, and preferably extending outwardly therefrom, whereby light from a light source behind such translucent sheet and transmitted diffusely through such sheet to the cast resin body is uniformly transmitted also through such body to light evenly and brightly the entire colored cast resin body, and light transmitted diffusely through the outer portions of said translucent sheet around the colored cast resin body, highlights the colored representation in the brightly lighted colored cast resin body. Preferably, a border area, which may be of decorative design, and formed of an opaque polyester resin, is disposed around the outer edge portions of the translucent resin sheet.

The above lamp element is attached over a front opening in a lamp box containing a lamp such as an electric light bulb, preferably positioned directly behind the colored cast resin body. The result is a brightly colored glass-like appearance of the colored representation in the colored cast resin body highlighted by the light passing through the adjacent portions of the translucent sheet and framed by the decorative border area.

This invention relates to production of a lamp element and lamp, particularly designed for use in children's rooms, formed of a three dimensional colored, preferably multicolored, polyester cast resin body, formed by embedding a colored or multicolored fiber glass paper inlay, into the cast resin body, such colored cast resin body being mounted on a translucent element, and the unit in turn positioned at the front of a light box containing a light source or a lamp.

In my copending application Ser. No. 53,918, filed July 10, 1970, there is disclosed production of a three dimensional plastic colored article produced by forming a colored particularly multicolored reproduction, pattern or design, such as that of a cartoon character, preferably by silk screening, on a fiber glass paper, and embedding the colored fiber glass paper in a clear polyester resin in a mold having the shape and configuration of the colored fiber glass paper, resulting in a three dimensional plastic duplicate of the colored fiber glass inlay, having the corresponding coloration and outlines of the colored inlay, and creating a pleasing three dimensional effect when viewed.

It has now been found that by suitably mounting such three dimensional colored cast resin body on a translucent plastic sheet, preferably formed of a translucent polyester resin, and particularly wherein the translucent polyester sheet extends outwardly beyond the colored cast resin representation, or figure, such unit can be mounted at the front of a lamp or light box, with a lamp, e.g. a conventional electric light bulb, preferably positioned directly behind the translucent plastic sheet and colored cast resin body. The result is highly unusual and pleasing, where for example the colored cast resin body is that of a cartoon character, since the light from the lamp is transmitted diffusely through the translucent plastic sheet directly behind the colored cast resin body and evenly distributes the light throughout the entire area of the cast resin body without having a bright or hot spot in local areas of the colored cast resin body. This is true even though the lamp or source of light in the lamp box is a relatively small conventional electric light bulb, thus avoiding the use of an elongated or special type of bulb to evenly distribute light through the colored cast resin body. The result according to the present invention is a brightly lighted animated glass-like effect of the colored representation in the plastic resin body, particularly when such colored representation is for example a cartoon character.

The light which is diffusely transmitted through the translucent sheet in the areas surrounding the colored cast resin body highlights the colored representation in the evenly and brightly lighted color cast resin body, bringing out the colored representation, e.g. cartoon character, in the cast colored resin body in sharp and graphic detail.

According to a further feature of the invention, a border area or frame can be positioned around the outer edge portions of the translucent resin sheet, the border area preferably being an opaque polyester resin, and which can be molded to form a particular design or representation, such border area framing the colored cast resin body and functioning as a pleasing setting therefor.

In addition, if desired, additional colored representations, in the form of ornamental designs or reproductions, can be mounted on the translucent plastic sheet in the areas surrounding the colored cast resin body containing the colored fiber glass inlay, to produce a picture-like effect, e.g. for telling a story, as in the case for example of a colored cartoon character embodied in the cast polyester resin, with pictorial representations such as buildings, sky, trees, and sun, in the surrounding areas. Such additional pictorial representations can be in the form also of colored cast polyester resin, mounted on the translucent sheet in the same manner as the main colored cast resin body, as described in detail hereinafter.

If desired, the inner rear and side surfaces of the lamp box can be covered with a light reflecting material such as white or light colored paint, to provide high reflection of light from such back and side surfaces to the translucent sheet at the front of the lamp box, for transmission of such light therethrough, as described above.

The invention will be more clearly understood from the description below of certain preferred embodiments, taken in connection with the accompanying drawing wherein:

FIG. 1 is a perspective view of a lamp element according to the invention, comprising a colored plastic resin body in the form of a colored representation of a dog, mounted on a translucent plastic sheet and framed by a plastic border;

FIG. 2 is a perspective view of a light box containing an electric light bulb and suitable connections, on the front of which the lamp element of FIG. 1 is designed to be mounted;

FIG. 2a is a side view of the lamp element of FIG. 1 mounted on the light box of FIG. 2;

FIG. 3 illustrates the procedure for producing the lamp element of FIG. 1;

FIG. 4 is a cross section taken on line 4—4 of FIG. 1 of the lamp element produced according to the procedure illustrated in FIG. 3;

FIG. 5 is a cross section of another embodiment of the cast colored resin body containing the fiber glass paper inlay of the colored dog, produced according to an alternative procedure;

FIG. 6 illustrates the lamp element of FIG. 1, including background pictorial portions attached to the translucent resin sheet and disposed in the area surrounding the main colored cast resin body containing the pictorial representation of the dog; and FIG. 7 illustrates a modified lamp element containing background pictorial portions formed in a manner different from FIG. 6.

The drawings are exaggerated for greater clarity.

Referring to FIG. 1 of the drawing, there is illustrated a lamp element 10 according to the invention, including a cast resin body 12 of a colored representation, which can be, for example, a cartoon character, in the form of a colored dog 14 silk screened onto a surface of a permeable fiber glass paper 16 embedded in the cast resin body 12, as described in detail hereinafter, the colored cast resin body 12 containing the colored dog inlay, being mounted on a translucent polyester resin sheet 18, which also has mounted thereon an opaque cast polyester resin border or frame, at 20.

Referring now to FIG. 2, the lamp element 10 of FIG. 1 is mounted on the front of a metal light box 22 having mounted therein a conventional small electric light bulb 24 positioned approximately centrally within the light box. The light bulb 24 is screwed into the conventional electric socket 26 which is mounted on a bracket 28 fastened to the back panel 30 of the light box 22. The electric leads 32 are passed through the bottom 34 of the light box, with the conventional switch 36 being provided for actuating the light bulb. The sides or side portions 38 of the light box are disposed at an angle for a purpose described hereinafter. The front of the light box 22 is open, as indicated at 40, with a flange 42 provided along the peripheral edges of the box around the opening. If desired, the inside of the metal box can be painted with a white or light, e.g. pastel colored, light reflecting paint, or by plating a highly reflecting metal on the inside surface of the box.

Referring now also to FIG. 2a, the lamp element 10 is mounted over the opening 40 at the front of the light box 22, by means of suitable fasteners such as screws 44. Note in FIG. 2a that the light bulb 24 in box 22 is positioned directly behind the colored cast resin body 12 containing the colored fiber glass inlay, and behind the translucent sheet 18.

Referring now to FIG. 3 of the drawing, illustrating the procedure for producing the lamp element 10 of the invention, clear liquid polyester resin at 46 is poured into a central mold portion 49 of a mold 48, the mold having the surface contour 50 in the central portion thereof corresponding to a negative replica of the surface contours to be reproduced in the outer surface of the cast resin body, and corresponding to the external surface contours of the various parts of the body of the multicolored dog shown at 14 in FIG. 1. The resin preferably employed in accordance with the invention is a conventional clear polyester casting resin available commercially in the trade from various manufacturers. Generally, such polyester resins are produced by reaction of dibasic acids such as maleic acid, with dihydric alcohols, and usually containing an unsaturated monomer such as styrene. The polyester is available commercially in the first stage of polymerization, that is the ester formation stage. Just prior to use, that is just prior to pouring in the mold, a suitable peroxide catalyst such as methyl ethyl ketone peroxide, is added, to effect hardening, which can take place at room temperature over an extended period, or such hardening can be accelerated by the application of heat. Mixtures or blends of various types of polyester resins can be employed so as to obtain a desired type of cast resin product, which can be either hard and glass-like or relatively soft and flexible and hence shatter-proof if dropped.

The front pour resin comprising the body of liquid resin at 46 fills about ⅔ of the extent of the mold height at 56, and a fiber glass paper inlay 16 containing the colored dog 14 of FIG. 1, die cut to the outer shape of the central mold portion 49, is then placed on the surface of the body of liquid resin 46, with the colored dog 14 on the front surface facing the bottom or surface contour 50 of the mold. The fiber glass paper employed is a commercially available material which can range in thickness from about 5 to about 10 mils, e.g. about 7 mils. An illustrative type of fiber glass paper which can be used is K-Mat 155 or K-Mat 158 marketed by Strathmore Paper Co. having a basis weight of 22 lbs./3000 sq. ft. and a thickness of 7 mils. The characteristics of such fiber glass paper embedded in the resin allows the resin to soak through the paper without fracturing the resin body, that is, the fiber glass paper is compatible with the polyester resin, and the resin in effect assimilates the fiber glass paper and the colored reproduction thereon, that is the colored dog 14, as part of the resin body, as described in my above copending application.

In preferred practice, the colored pattern or reproduction, in the form of the multicolored dog 14 in the present embodiment, is applied to a surface of the fiber glass paper inlay 16 by a silk screen process, wherein various colors are individually applied to the surface of the fiber glass paper by means of a silk screen, in order to produce a multicolored reproduction such as the multicolored dog 14, which is clear and distinct.

In the above noted silk screen process for producing a colored or multicolored reproduction such as the colored dog 14 on a fiber glass paper 16, the use of solvent type dyes particularly produces best results in the form of clear sharp colors when the colored fiber glass paper inlay is embedded in the polyester resin. Representative of such solvent type dyes are coal tar dyes, which can be aniline dyes, monoazo dyes and anthraquinone dyes, and the like, specific examples thereof being Oil Scarlet 6 G Base (Allied Chemical Corp.), Suddan Yellow (General Aniline and Film Corp.) and Luxol Fast Brilliant Blue-MBSN (Du Pont Co.), as described in the above noted copending application. Other components of the formulations which are employed in the silk screen process to produce a multicolored representation on the fiber glass paper, include organic solvents such as acetone, and resin vehicles such as cellulose acetate, alkyd resins, and the like. Although not preferred, pigment dyes, which are not solvent soluble but are dispersible in the various media including solvents and resins of the type noted above, can also be employed, as also described in the above noted copending application.

Following placement of the colored fiber glass inlay 16 on the surface of the front pour resin 46. referring again to FIG. 3, additional liquid polyester resin at 51 is then poured over the colored fiber glass paper inlay 16 to the predetermined depth or thickness of the colored cast resin body to be produced in the mold, up to the planar surfaces 56 of the mold, such resin 51 constituting a second or back pour. The liquid resin permeates through the fiber glass paper 16, completely wetting the paper without formation of bubbles in the resin adjacent the paper surfaces.

An opaque polyester resin 54 of a preselected color such as blue is then poured in a second mold portion 52 of the mold 48, such mold portion forming a border or frame around the first or central mold portion 49 for producing the clear polyester resin body containing the colored fiber glass inlay 16. The contour of the mold portion 52 can be designated to provide a sculptured resin body around the border, of a predetermined design, as illustrated in FIG. 1, to set off the main central character, namely the plastic colored representation of the dog formed in the central portion 49 of the mold. The opaque resin body 54 thus poured in the border portion 52 of the mold is applied to a depth up to about the planar surfaces 56 of the mold, as is done in the case of the back pour of clear polyester resin 51 in the central mold portion 49.

A white liquid translucent polyester resin layer is then poured across the entire surface area of the mold 48, as indicated at 58 in FIG. 3, covering the back pour 51 of clear polyester resin in the central mold portion 49, the upper surface of the opaque polyester resin body 54 in the border portions 52 of the mold, and the adjacent surface areas 56 of the mold. Such white translucent resin can be produced by adding from about ¼ to about 2% bismuth oxychloride white pigment pearl to the polyester resin. However, any suitable white dye or pigment can be employed for this purpose.

The same type of polyester resin can be employed at 54 and at 58 to provide the polyester border 20 and the translucent polyester sheet 18. Thus, for example, there can be employed as resins at 54 and 58 a mixture in the form of a blend of two different polyester resins, namely a blend of 2 parts of the polyester resin E-628 and 1 part of the polyester resin E-541A, both marketed by Sylmar Chemical Co., to which is added 2% of methyl ethyl ketone peroxide as catalyst. Such resin blend upon curing forms a relatively flexible resin so that the lamp element, if dropped, for example as result of handling by a child, will not shatter and present a danger of injury. Similarly, the clear polyester resin pours at 46 and 51 for production of the cast resin body 12, can be formed of the same type of polyester resin blend described above, forming a flexible polyester resin upon curing. It will be understood, however, that any suitable polyester resin or blends thereof, for production of a hard glass-like resin body or a relatively flexible body can be employed, as desired for the above purposes.

Following a short period of setting at ambient temperature in the mold, e.g. about 20 to about 30 minutes, the resulting article or lamp element 10, comprising the central cast resin body formed of the resin pours 46 and 51, having embedded therein the fiber glass paper inlay 16 disposed parallel to the rear surface 56' of the resin body, the resin body 54 functioning as border, and the translucent resin body 58, is passed through an infra red oven, operating at temperature ranging from about 140 to about 160° F. The unit 10 is permitted to remain in the oven for about 20 to about 50 minutes, and is then removed and permitted to cool. The resulting lamp element 10, illustrated in FIG. 4, thus comprises the cast clear resin body 12, colored by the multicolored dog 14 in the upper surface of the fiber glass paper inlay 16, the sculptured opaque cast polyester resin border or frame 20, and the translucent white polyester resin sheet 18, which as result of the curing is securely adhered to both the central cast resin body 12 comprising the multicolored dog, and the opaque polyester border 20.

When the resulting lamp element 10 is mounted on the front of the light box 22, as described above and illustrated in FIG. 2a of the drawing, with the electric light bulb 24 directly opposite the cast resin body 12 which provides the three dimensional colored reproduction of the colored dog silk screened on the fiber glass paper inlay therein, the light rays indicated at 60 impinging on the rear surface of the translucent sheet 18 directly behind the cast resin body 12, are diffusely transmitted through the central portion of the translucent sheet 18 and are then transmitted evenly through the cast resin body 12, as indicated at 62 to evenly and brightly light the entire colored cast resin body. This occurs even though the light source, that is the light bulb 24, is much smaller than the area of the cast resin body 12, so that an elongated light source extending over the entire length of the cast resin body 12 is not required.

Further, the light rays 64 emanating from the light bulb 24, which impinge on the outwardly extending portions of the translucent sheet 18 between the central cast resin body 12 and the opaque plastic border 20, are transmitted diffusely through the translucent sheet surrounding the cast resin body 12, such diffusely transmitted light through the outwardly extending portions of the resin sheet 18 highlighting the colored reproduction of the evenly and brightly lighted colored representation of the dog transmitted through the clear cast polyester resin 12.

As described in my above co-pending application, and referring particularly to FIG. 4, the clear transparent cast resin body 12 formed of the resin bodies 46 and 51, has a contoured front surface 14', and all of the colors and details of the colored dog 14 on the front surface of the colored fiber glass paper inlay 16, together with the corresponding irregular surface contours 14' of the resin body, combine when viewed from the front surface as indicated at 65, to produce a three dimensional exact replica of the multicolored dog, which appears to be animated when the lamp element 10 is viewed from different angles by an observer. The respective colored portions of the dog, evenly and brightly lighted by lamp 24, which appear through the cast resin body 12, referring to FIG. 2a, are sharp and clear and the lines of demarcation between the respective multicolored portions of the dog are also very sharp. When viewing the colored representation of the dog through the cast resin body the fiber glass paper 16 per se is practically invisible. It is noted that the dyes or pigments of which the colored dog is formed remain in the surface of the fiber glass paper inlay and do not permeate, wander or exude into the surrounding polyester resin body 12, which remains clear and transparent.

Upon viewing the colored figure of the dog through the cast resin body 12 when lighted by the lamp 24, the figure of the dog stands out sharply since a large portion of the light is transmitted through the clear resin body 12. The result is a highly lighted brightly colored animated glass-like effect obtained from the figure which is set off by the diffusely lighted surrounding area provided by transmission of the light diffusely through the surrounding portions of the translucent sheet 18, in the setting provided by the opaque colored border 20, providing sharp and graphic detail of the multicolored dog.

The angled sides or side portions 38 of the light box 22, which preferably are made highly reflecting by the lightly painted surface thereof, tends to gather light reflected from the light bulb 24 and to reflect such light forward to the front of the box at an angle particularly to concentrate such reflected light so that it impinges on the central portion at the rear of the translucent sheet 18 for transmission through such sheet and the cast resin body 12. It is particularly noteworthy that transmission of the light from the light bulb 24 through the central portion of the translucent sheet 18 and the cast resin body 12 does not form any bright or hot spots in local areas of the cast resin body 12 but rather results in a very uniform brightly lighted representation of the multicolored figure of the dog therein.

Referring to FIG. 5, there is illustrated a modification of the lamp element of FIG. 4, wherein the fiber glass paper inlay 16 having the multicolored dog 14 silk screened on the back surface of the fiber glass paper is positioned adjacent the rear surface 12' of the cast resin body 12, the translucent sheet 18 being secured to such rear surface 12' of the cast resin body as described above with respect to the embodiment of FIG. 4. In producing the lamp element of FIG. 5, the same molding procedure as described above with respect to FIG. 3 is carried out, except that the colored fiber glass paper inlay 16 is placed on the upper surface of the liquid resin body 46, filled to a depth approximately equal to the adjacent surfaces 56 of the mold, with the reverse printed colored representation of the dog 14 on the rear surface thereof. When the resulting lamp element 10', which is the same as lamp element 10 in FIG. 4, except for the rear positioning of the colored fiber glass paper inlay 16 with respect to the cast resin body, is placed at the front of light box 22 lighted by the light bulb 24 and viewed, the dog is somewhat magnified because of the position of the colored dog in the back layer of the fiber glass paper and at the back surface of the resin body 12, and at a substantial distance from the front surface thereof. Again a brightly lighted remarkable likeness of the multicolored dog on the fiber glass paper inlay is observed, highlighted by the diffused light rays passing through the surrounding translucent portions of the translucent sheet 18.

Referring now to FIG. 6, there is illustrated a modification of the lamp element illustrated in FIGS. 1 and 4, wherein colored background features are introduced, such as the dog house illustrated at 68, and ground features such as plants at 70. Such elements 68 and 70 can be incorporated in the background areas around the central dog character in the cast resin body 12 and positioned on the translucent sheet 18, by incorporating in mold 48 in FIG. 3, for example, additional mold portions indicated by the dotted lines 68' and 70', for incorporation therein of colored polyester resin bodies, so that upon curing of the lamp element there are produced the corresponding cast resin colored dog house 68 and ground features such as plants 70, illustrated in dotted lines in FIG. 4, also secured to the polyester translucent sheet 18.

However, if desired, other types of background scenes can be incorporated by means other than molding such features as described above, e.g. such background scenes or elements can be colored representations incorporated into the translucent sheet 18 or into clear flat polyester resin portions attached to the rear of said translucent sheet.

The embodiment of FIG. 7 illustrates the latter modification. In FIG. 7, a clear polyester resin layer 71 is secured or molded to the clear cast resin body 12 and to the frame portion 20, and in the outer surface of such layer 71 is embedded a fiber glass paper inlay 16' with the multicolored dog 14 silk screened in the inner surface of such paper and in direct alignment with the cast resin body 12. The fiber glass paper 16' also has applied on the same surface thereof the colored pictorial representations of the dog house 68a and plants 70a, which are located in the outer portions of the fiber glass paper 71. The translucent polyester sheet 18 is secured to the rear surface of the clear polyester resin layer 71.

When the resulting lamp element 10'' of FIG. 7 is mounted on light box 22, as illustrated in FIG. 2a, a result similar to that with respect to the lamp element of FIG. 6 is observed, the pictorial scenes at 68a and 70a now being in flat resin portions of polyester resin layer 71, rather than in the individual molded colored raised portions 68 and 70 of FIGS. 4 and 6.

It will be understood that if desired, the resin border or frame member 20 can be deleted, with only the cast resin body 12 containing the multicolored fiber glass paper inlay 16 being mounted as described above on the translucent polyester sheet 18.

It will be further understood that any type of light can be employed in the light box for illuminating the multicolored dog or other figure mounted on the translucent sheet, for example a light or lights of different colors can be employed, or a light wheel of different colors can be employed, with the color changing each time the wheel passes across the light bulb 24.

Also, for added decorative effect, phosphorescence can be added either to the border area 20, the translucent sheet 18, and/or to the cast resin body 12 containing the multicolored fiber glass inlay. Also, panelescent light formed of a glowing flat metal can be employed in place of the electric light bulb 24.

It will of course be understood that any colored or multicolored character, representation or reproduction can be provided in the cast resin body 12 mounted on the translucent sheet, by employing any desired corresponding colored or multicolored fiber glass paper inlay for such cast resin body.

Although the lamp element disclosed herein has been described for use in providing a lamp particularly designed for mounting on a wall or on furniture such as a table, e.g. a lamp for a child's room, it will be understood that the principles of the invention can be applied for the design and production of a lamp element for use in constructing a lamp according to the invention, having any desired utility such as a table lamp, a hanging or swag lamp, or as a lighting fixture.

From the foregoing, it is seen that the invention provides a novel and highly attractive decorative lamp element and lamp, and procedure for producing same.

While I have described particular embodiments of my invention for the purpose of illustration, it should be understood that other modifications and adaptations thereof may be made within the spirit of the invention, and hence the invention is not to be taken as limited except by the scope of the appended claims.

I claim:

1. A decorative light diffusing element which comprises a three dimensional plastic colored representation comprising a clear transparent polyester cast resin body having a colored fiber glass paper inlay embedded in said resin body, said cast resin body having an external shape corresponding to the external shape of said colored inlay, and having a thickness substantially greater than the thickness of said fiber glass paper inlay, forming a three dimensional plastic duplicate of said colored inlay, having the corresponding coloration and outlines of said colored fiber glass paper inlay; and a light translucent plastic sheet attached to the rear surface of said colored cast resin body and covering the entire rear surface thereof.

2. An article as defined in claim 1, wherein said plastic sheet is a light translucent polyester resin sheet.

3. An article as defined in claim 2, said fiber glass paper inlay being multicolored, the front surface of said cast resin body being being contoured to a predetermined shape in accordance with the multicolored design of said multicolored fiber glass paper inlay, the rear surface of said cast resin body being essentially planar, and said three dimensional plastic duplicate of said colored inlay having the corresponding multicolored configuration of said inlay and creating a three dimensional effect when said cast resin body containing said colored fiber glass paper inlay is viewed at different angular positions by the eye of an observer.

4. An article as defined in claim 3, wherein said multicolored fiber glass paper inlay has a silk screened multicolored configuration on at least one side of said fiber glass paper.

5. An article as defined in claim 2, said translucent sheet extending outwardly beyond the outer edges of said colored cast resin body and surrounding same, whereby light transmitted diffusely through said outwardly extending portions of said translucent sheet highlights the colored reproduction in the evenly and highly lighted colored cast resin body.

6. An article as defined in claim 4, said translucent sheet extending outwardly beyond the outer edges of said colored cast resin body and surrounding same, whereby light transmitted diffusely through said outwardly extending portions of said translucent sheet highlights the colored reproduction in the evenly and highly lighted colored cast resin body.

7. An article as defined in claim 5, including a border area disposed around the outer edge portions of said translucent resin sheet, said border area comprising an opaque polyester resin, said border area framing said colored cast resin body and functioning as a setting therefor.

8. An article as defined in claim 6, including a border area disposed around the outer edge portions of said translucent resin sheet, said border area comprising an opaque polyester resin, said border area framing said colored cast resin body and functioning as a setting therefor.

9. An article as defined in claim 5, including colored background representations mounted on said outwardly extending portions of translucent sheet adjacent said colored cast resin body, said colored background representations comprising colored cast polyester resin.

10. An article as defined in claim 5, including colored background representations mounted on said outwardly extending portions of said translucent sheet adjacent said colored cast resin body, said colored background representations comprising clear flat polyester resin portions attached to the rear of said translucent sheet and a colored fiber glass paper inlay embedded in said flat polyester resin portions.

11. A decorative light diffusing element which comprises a three dimensional plastic colored representation comprising a clear transparent polyester cast resin body having a colored fiber glass paper inlay embedded in said resin body, said cast resin body having an external shape corresponding to the external shape of said colored inlay, and having a thickness substantially greater than the thickness of said fiber glass paper inlay, forming a three dimensional plastic duplicate of said colored inlay, having the corresponding coloration and outlines of said colored fiber glass paper inlay; and a white translucent plastic sheet attached to the rear surface of said colored cast resin body and covering the entire rear surface thereof.

12. An article as defined in claim 5, including colored background representations mounted on said outwardly extending portions of said translucent sheet adjacent said colored cast resin body, said colored background representations comprising clear flat polyester resin portions attached to the rear of said translucent sheet.

13. An article as defined in claim 2, including a clear polyester resin layer secured to said cast resin body, said colored fiber glass paper inlay embedded in the rear surface of said clear polyester resin layer, including colored background representations in the outer portions of said fiber glass paper inlay, said translucent plastic sheet being secured to the rear surface of said clear polyester resin layer.

References Cited

UNITED STATES PATENTS

| | | | |
|---|---|---|---|
| 3,518,146 | 6/1970 | Plympton | 161—5 X |
| 3,246,066 | 4/1966 | Gits | 161—138 X |
| 3,264,164 | 8/1966 | Jerothe et al. | 161—6 X |
| 3,072,973 | 1/1963 | Barnette | 264—247 |
| 3,451,876 | 6/1969 | Edelmann et al. | 161—5 X |

PHILIP DIER, Primary Examiner

U.S. Cl. X.R.

161—5, 18, 138